(12) United States Patent
Yoneda et al.

(10) Patent No.: US 7,148,841 B2
(45) Date of Patent: Dec. 12, 2006

(54) RADAR DEVICE

(75) Inventors: Kimihisa Yoneda, Hyogo (JP); Masaki Hiromori, Kanagawa (JP)

(73) Assignees: Fujitsu Ten Limited, Kobe (JP); Fujitsu Limited, Kawasaki (JP)

( * ) Notice: Subject to any disclaimer, the term of this patent is extended or adjusted under 35 U.S.C. 154(b) by 129 days.

(21) Appl. No.: 11/080,482

(22) Filed: Mar. 16, 2005

(65) Prior Publication Data

US 2006/0055588 A1    Mar. 16, 2006

(30) Foreign Application Priority Data

Mar. 16, 2004    (JP)    ................ P2004-074722

(51) Int. Cl.
  *G01S 7/282*    (2006.01)
  *G01S 13/28*    (2006.01)

(52) U.S. Cl. .............. 342/132; 342/134; 342/135; 342/145; 342/201; 342/202

(58) Field of Classification Search ........... 342/118, 342/128–146, 108, 109, 189, 194–196, 174, 342/200–204, 175
See application file for complete search history.

(56) References Cited

U.S. PATENT DOCUMENTS

| | | | | |
|---|---|---|---|---|
| 4,241,347 A * | 12/1980 | Albanese et al. | ............. | 342/89 |
| 5,731,781 A * | 3/1998 | Reed | ............. | 342/135 |
| 5,731,782 A | 3/1998 | Walls | ............. | 342/145 |
| 5,959,571 A * | 9/1999 | Aoyagi et al. | ............. | 342/70 |
| 6,130,636 A * | 10/2000 | Severwright | ............. | 342/120 |
| 6,381,261 B1 * | 4/2002 | Nagazumi | ............. | 375/138 |
| 6,714,286 B1 * | 3/2004 | Wheel | ............. | 356/5.05 |
| 6,822,605 B1 * | 11/2004 | Brosche | ............. | 342/130 |
| 6,989,784 B1 * | 1/2006 | Hiromori et al. | ............. | 342/165 |
| 7,075,477 B1 * | 7/2006 | Hiromori et al. | ............. | 342/82 |
| 2005/0001758 A1 * | 1/2005 | Hiromori et al. | ............. | 342/82 |
| 2005/0180491 A1 * | 8/2005 | Hiromori | ............. | 375/142 |
| 2005/0212692 A1 * | 9/2005 | Iny et al. | ............. | 342/42 |
| 2006/0055588 A1 * | 3/2006 | Yoneda et al. | ............. | 342/70 |

FOREIGN PATENT DOCUMENTS

| | | |
|---|---|---|
| EP | 410563 A2 * | 1/1991 |
| EP | 574282 A1 * | 12/1993 |

(Continued)

OTHER PUBLICATIONS

"A pre-crash radar sensor system based on pseudo-noise coding", Filimon, V.; Buechler, J. Microwave Symposium Digest., 2000 IEEE MTT-S Int'l vol. 3, 2000 Ps:1415-1418.*

(Continued)

Primary Examiner—John B. Sotomayor
(74) Attorney, Agent, or Firm—Oliff & Berridge, PLC

(57) ABSTRACT

A radar device includes a code generator, a transmission section, a reception section, a delay section, a despreading process section, a correlation value detection section, a target detection section, an estimation section, an acquisition section, and a correction section. The estimation section estimates a reception intensity of a reflection wave from a target located at a first distance on a basis of a detected correlation value. The acquisition section acquires a cross-correlation value between the first distance and a second distance, on a basis of the estimated reception intensity of the reflection wave from the target located at the first distance, a delayed despreading code used to detect a correlation value for the first distance and a delayed despreading code used to detect a correlation value for the second distance. The correction section corrects the correlation value for the second distance on a basis of the cross-correlation value.

11 Claims, 15 Drawing Sheets

FOREIGN PATENT DOCUMENTS

| | | |
|---|---|---|
| EP | 0 694 171 B1 | 1/1996 |
| EP | 1 178 330 A1 | 2/2002 |
| EP | 1566656 A2 * | 8/2005 |
| JP | U 05-002092 | 1/1993 |
| JP | A 2000-009833 | 1/2000 |
| JP | A 2000-137073 | 5/2000 |
| JP | 2005207932 A * | 8/2005 |

OTHER PUBLICATIONS

Wycoff et al., "Scale Time Offset Robust Modulation," 2003 IEEE Military Communications Conference, vol. 2 of 2, pp. 330-335, XP010698262 {Oct. 13, 2003}.

* cited by examiner

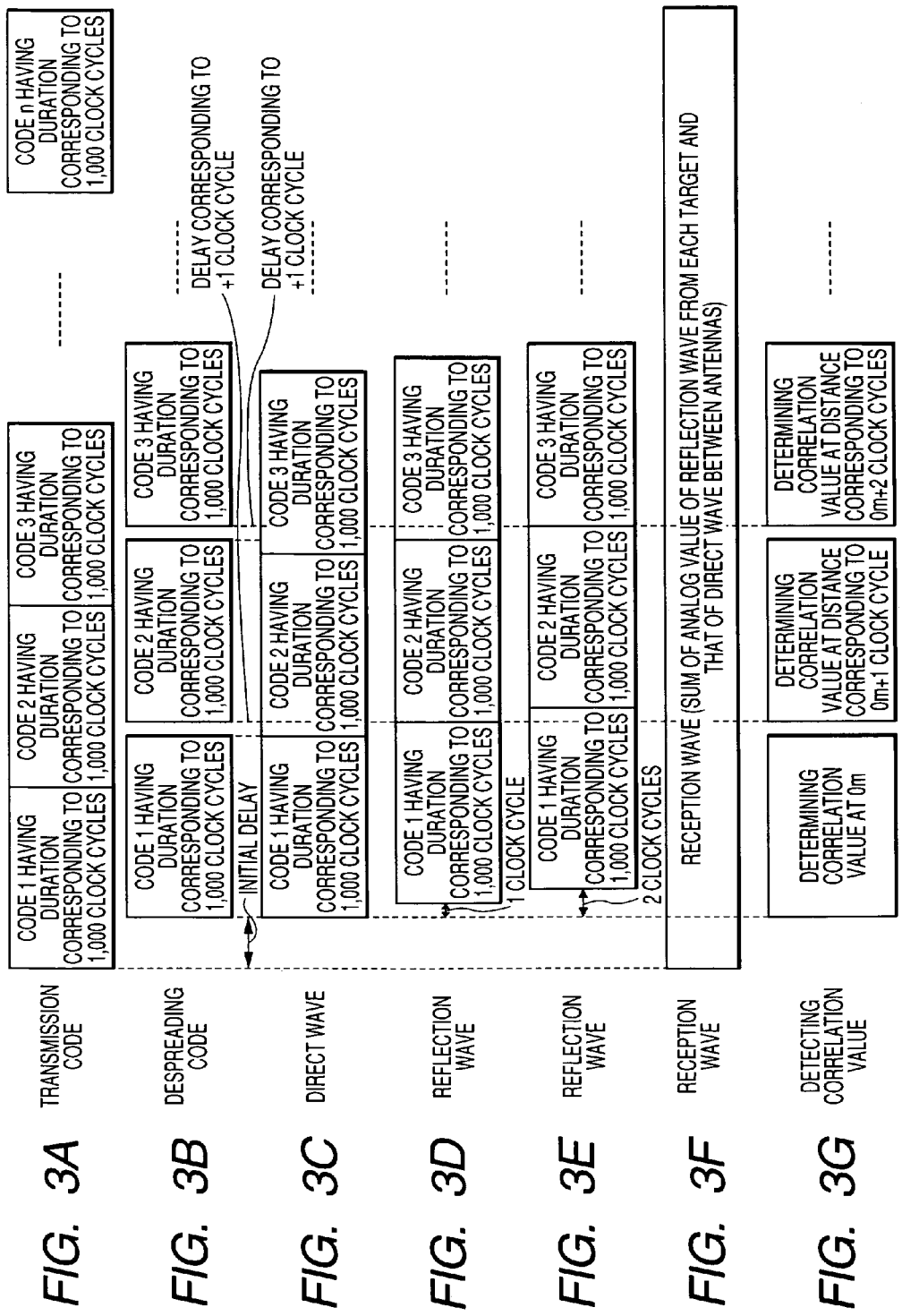

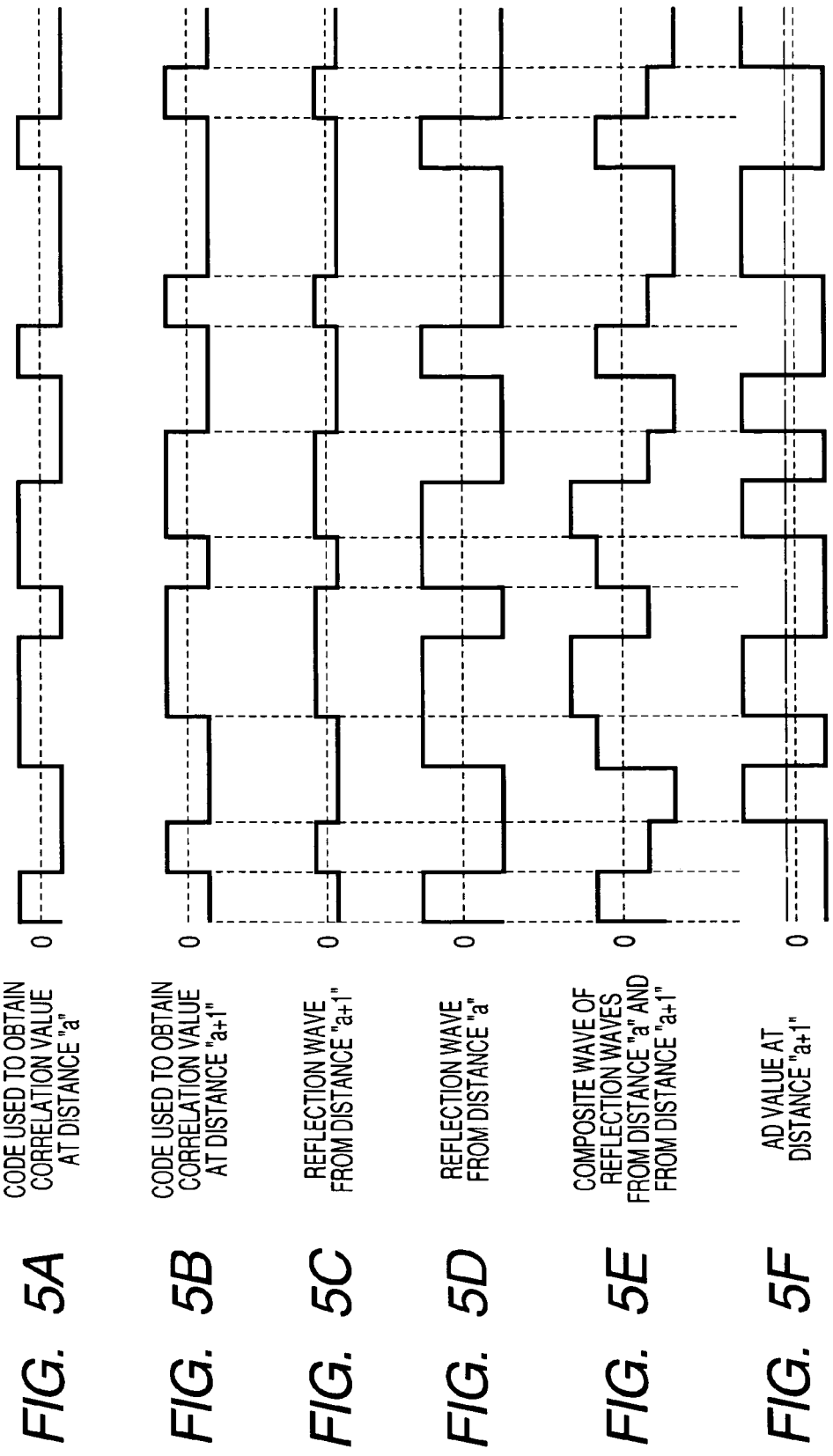

FIG. 10

| DISTANCE a+1 | DISTANCE a | | | | | |
|---|---|---|---|---|---|---|
| | 0 | 1 | 2 | 3 | ... | n |
| 0 | — | | | | | |
| 1 | +2 | — | | | | |
| 2 | -2 | +1 | — | | | |
| 3 | +1 | -2 | +1 | — | | |
| ... | ... | | | | ... | |
| n | +3 | +1 | -1 | -2 | | — |

FIG. 11

COINCIDENCE LEVEL BETWEEN CODES

| | RECEPTION INTENSITY | | | |
|---|---|---|---|---|
| | 1 | 2 | ... | N |
| -3 | -3 | -6 | | -3N |
| -2 | -2 | -4 | | -2N |
| -1 | -1 | -2 | ... | -N |
| 0 | 0 | 0 | ... | 0 |
| +1 | +1 | +2 | ... | +N |
| +2 | +2 | +4 | | +2N |
| +3 | +3 | 6 | | +3N |

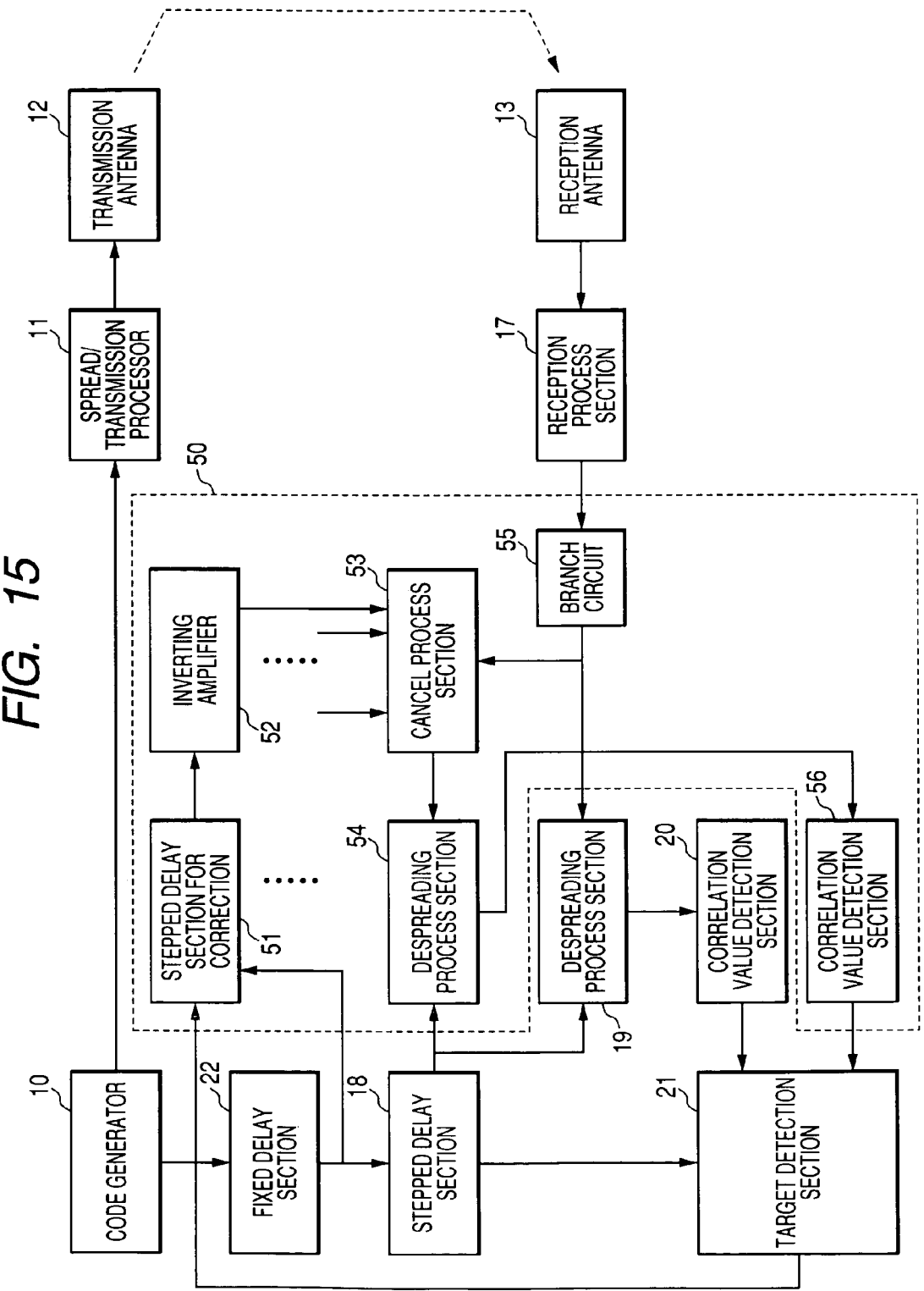

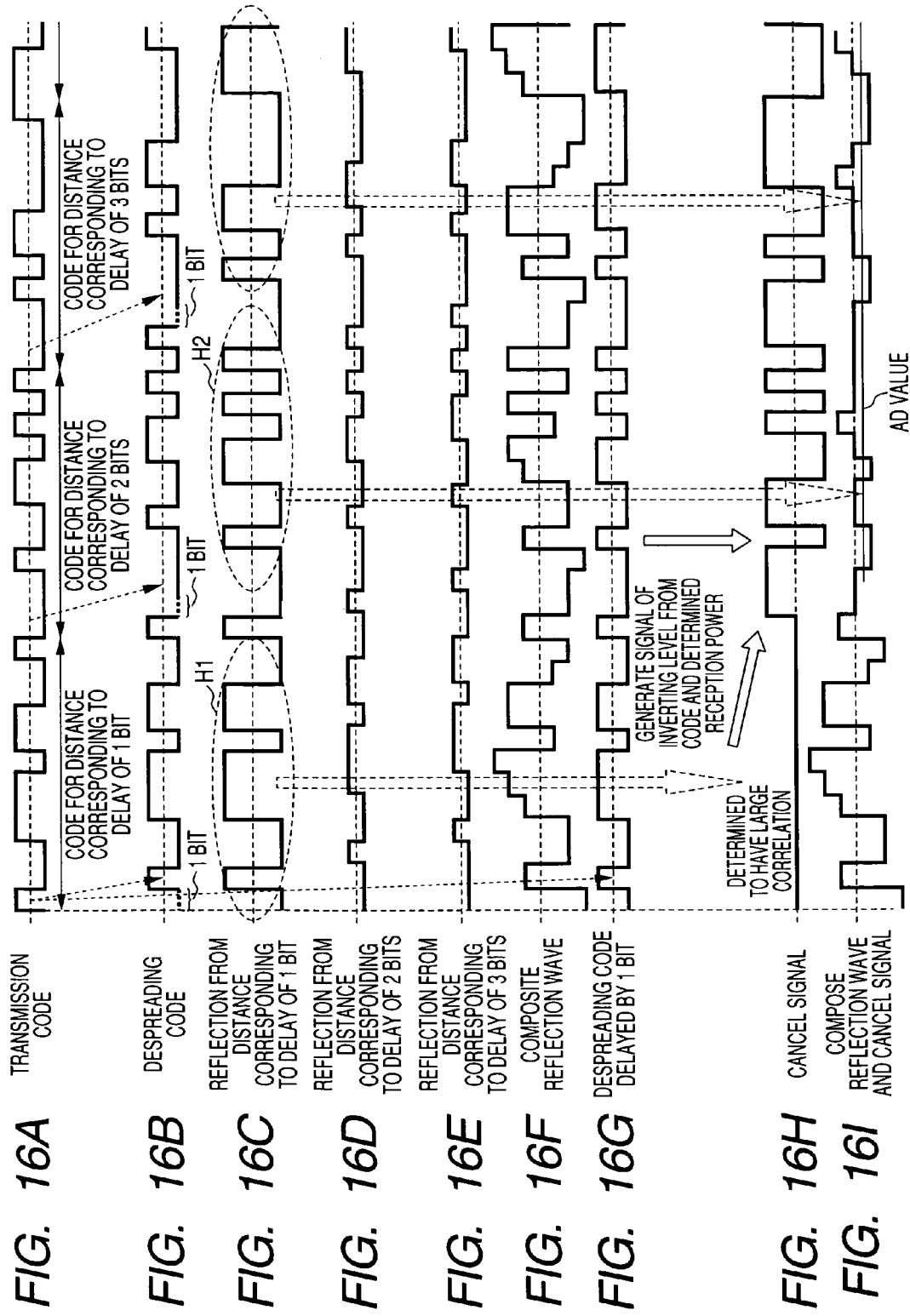

RADAR DEVICE

BACKGROUND OF THE INVENTION

1. Field of the Invention

The present invention relates to a radar device based on a spread spectrum technique.

2. Description of the Related Art

UWB (ultra wide band) radar devices, which employ a spread spectrum technique, have been developed. In the spread spectrum technique, communication is effected while data are spread in a wide band with use of a certain code sequence so as to reduce influences of interference from other communication systems. In a case where, for instance, the radar device is an on-vehicle radar device, the radar device can detect, with high precision, whether or not an obstacle (a target) is present ahead of the vehicle, a distance between the vehicle and the target, a relative velocity between the vehicle and the target, and the like.

JP-U-Hei. 5-2092 and JP-A-2000-137073 disclose general spread spectrum radar devices at the time the invention was made, but do not disclose features of the claimed invention.

SUMMARY OF THE INVENTION

However, the reflection intensity of transmitted electric wave differs considerably, for instance, between a case where a target to be detected is a vehicle and a case where the same is a human body. When the reflection intensities of the respective targets differ as above, a UWB radar device can distinguish only a target whose reflection intensity falls within a predetermined range from the maximum reflection intensity. Accordingly, in some cases, the radar device fails to distinguish a target of low reflection intensity, such as a human body, even when the target is in the vicinity of the vehicle on which the radar device is mounted.

FIG. 1 is a view showing a relationship between reflection intensity from a target and target-distinguishing ability of a UWB radar device. In FIG. 1, reference numeral 1 denotes a transmission antenna of the UWB radar device; 2 denotes a reception antenna of the UWB radar device; and 3 to 5 denote targets ahead of a vehicle on which the UWB radar device is mounted. The target 3 is a target of low reflection intensity, such as a human body. The target 4 is a target of medium reflection intensity, such as a road sign. The target 5 is a target of high reflection intensity, such as another vehicle traveling ahead of the vehicle. Reference numeral 6 denotes a direct wave between the transmission antenna 1 and the reception antenna 2.

In this case, the UWB radar device can distinguish the target 4 of medium reflection intensity. However, in some cases, the UWB radar device may fail to distinguish the target 3 of low reflection intensity because the reflection wave from the target 3 is buried in noise generated by the target 5 of high reflection intensity.

The invention has been made to solve the above described problem, and provides a radar device, which can effectively detect a target by means of eliminating influence of cross-correlation caused by a target of high reflection intensity to thus obtain an accurate auto-correlation value even when the target is of low reflection intensity.

A radar device includes a code generator, a transmission section, a reception section, a delay section, a despreading process section, a correlation value detection section, a target detection section, an estimation section, an acquisition section, and a correction section. The code generator generates a spectrum spreading code and a despreading code. The transmission section transmits a signal modulated with the spectrum spreading code. The reception section receives a reflection wave of the signal, which is transmitted from the transmission section and reflected by a target. The delay section delays the despreading code stepwise. The despreading process section applies a despreading process to a signal received by the reception section, with using the despreading code delayed step wise. The correlation value detection section detects a correlation value from data output from the despreading process section. The target detection section determines as to whether or not a target is present, based on the detected correlation value. The estimation section estimates a reception intensity of a reflection wave from a target located at a first distance from the radar device, on a basis of the correlation value detected by the correlation value detection section. The acquisition section acquires a cross-correlation value between the first distance and a second distance, on a basis of (x) the estimated reception intensity of the reflection wave from the target located at the first distance, (y) a delayed despreading code used to detect a correlation value for the first distance and (z) a delayed despreading code used to detect a correlation value for the second distance. The correction section corrects the correlation value for the second distance, which is detected by the correlation value detection section, on a basis of the cross-correlation value acquired. The first distance is different from the second distance.

With this configuration, the radar device can obtain influence degree of a reflection wave from a target of high reflection intensity onto a reflection wave from another target located at another distance (second distance), as a cross-correlation value. Accordingly, since the correction section corrects the correlation value for the second distance, which is detected by the correlation value detection section, on the basis of the cross-correlation value acquired, the radar device can acquire the precise correlation value. As a result, the radar device can detect presence of a target appropriately even when the target is of low reflection intensity.

In the radar device, the estimation section, the acquisition section and the correction section may be implemented by a program stored in the target detection section.

Furthermore, in the radar device, the estimation section may have a table regarding the reception intensity of the reflection wave, the table prepared in advance as a function of the correlation value detected by the correlation value detection section.

Still furthermore, in the radar device, the acquisition section may have a cross-correlation value table, which is prepared in advance as a function of (p) the reception intensity of the reflection wave and (q) a coincidence level between the delayed despreading code used to detect a correlation value for the first distance and the delayed despreading code used to detect a correlation value for the second distance.

As described above, if the target detection section stores a program for correcting the correlation value and a correlation value is corrected every time when the correction value is detected, the correlation value can be corrected without requiring hardware. In addition, a result of calculation required for determining the cross-correlation value can be obtained by reference to the table having been prepared in advance. Accordingly, processing speed is increased.

According to a second embodiment of the invention, a radar device includes a code generator, a transmission section, a reception section, a first delay section, a first correlation value detection section, a target detection section, and a correction circuit. The code generator generates a spectrum spreading code and a despreading code. The transmission section transmits a signal modulated with the spectrum spreading code. The reception section receives a reflection wave of the signal, which is transmitted from the transmission section and reflected by a target. The first delay section delays the despreading code stepwise. The first despreading process section applies a despreading process to a signal received by the reception section, with using the despreading code delayed stepwise. The first correlation value detection section detects a correlation value from data output from the first despreading process section. The target detection section determines as to whether or not a target is present, based on the detected correlation value. The correction circuit includes a second delay section, an inverting amplification section, and a cancel process section. The second delay section delays the despreading code generated by the code generator by a predetermined amount. The inverting amplification section inverts and amplifies the despreading code delayed by the second delay section to generate a cancel signal. The cancel process section superimposes the cancel signal onto the signal received by the reception section.

With this configuration, the inverting amplification section electrically generates a reflection wave having been reflected from a target, which is located at a known position and whose reflection intensity is known, on the basis of the despreading code used to determine the position of the target and the known reflection intensity; and produces a cancel signal by means of inverting the thus-generated reflection wave. Accordingly, the radar device superimposes the cancel signal on a received signal, to thereby eliminate from the received signal the influence of the reflection wave having been reflected by another target, which is located at the other distance and of high reception intensity. As a result, the radar device can detect a correlation value even of a reflection wave having been reflected by a target of low reception intensity, accurately.

In addition, in the radar device, the second delay section may have a plurality of second delay sections. The inverting amplitude section may have a plurality of an inverting amplitude sections. Number of the second delay sections and number of the inverting amplitude sections may correspond to number of targets whose positions and reflection intensities are fixed and whose influence on a reflection wave is to be cancelled.

As a result, even in a case where a peak of correlation spreads across a plurality of unit distances each corresponding to a resolution of the radar device, as in a case of, for instance, a direct wave, the influence thereof can be effectively eliminated.

Furthermore, in the radar device, the second delay section may delay the despreading code generated by the code generator stepwise. The inverting amplitude section may generate the cancel signal on a basis of (s) a timing at which the target detection section detects a target the reception intensity of the reflection wave from which is larger than a predetermined threshold level, and (t) the reception intensity of the reflection wave from the target. Accordingly, the inverting amplification section generates the cancel signal even for a target other than a target, which is located at a known position and has a known reception intensity, on the basis of a correlation value determined in the target detection section and the timing of detection. Therefore, by means of superimposing the cancel signal on the received signal, the influence imparted by a reflection wave having been reflected by a target of high reflection intensity on receiving another reflection wave having been reflected by another target located at another distance is eliminated. Accordingly, an accurate correlation value can be obtained.

Still furthermore, in the radar device, the correction circuit further may have a branch circuit, a second despreading process section, and a second correlation value detection section. The branch circuit branches an output of the reception section. The second despreading process section applies the despreading process to an output of the cancel process section with using the despreading code delayed by the second delay section. The second correlation value detection section detects a correlation value from an output the second despreading process section. The branched output of the reception section is input to the cancel process section.

With this configuration, a path for eliminating the influence of a target of high reflection intensity is formed as an alternative path for a normal path for processing a received signal as is. Consequently, a correlation value can be corrected as required.

BRIEF DESCRIPTION OF THE DRAWINGS

FIG. 3 is a timing chart for explaining operations of the radar device shown in FIG. 2:

FIG. 5 is a view for showing the influence of a reflection wave from a target of high reflection intensity at a time when a correlation value is obtained;

FIG. 10 is a view showing a table, which indicates coincidence levels between codes employed in the second embodiment;

FIG. 11 is a view showing a cross-correlation value table employed in the second embodiment;

FIG. 15 is a block diagram showing a UWB radar device according to a fifth embodiment of the invention; and FIGS. 16A to 16I are waveform diagrams for explaining operations of the UWB radar devices according to the third to fifth embodiments.

DETAILED DESCRIPTION OF THE PREFERRED EMBODIMENTS (First Embodiment)

Figure 1:
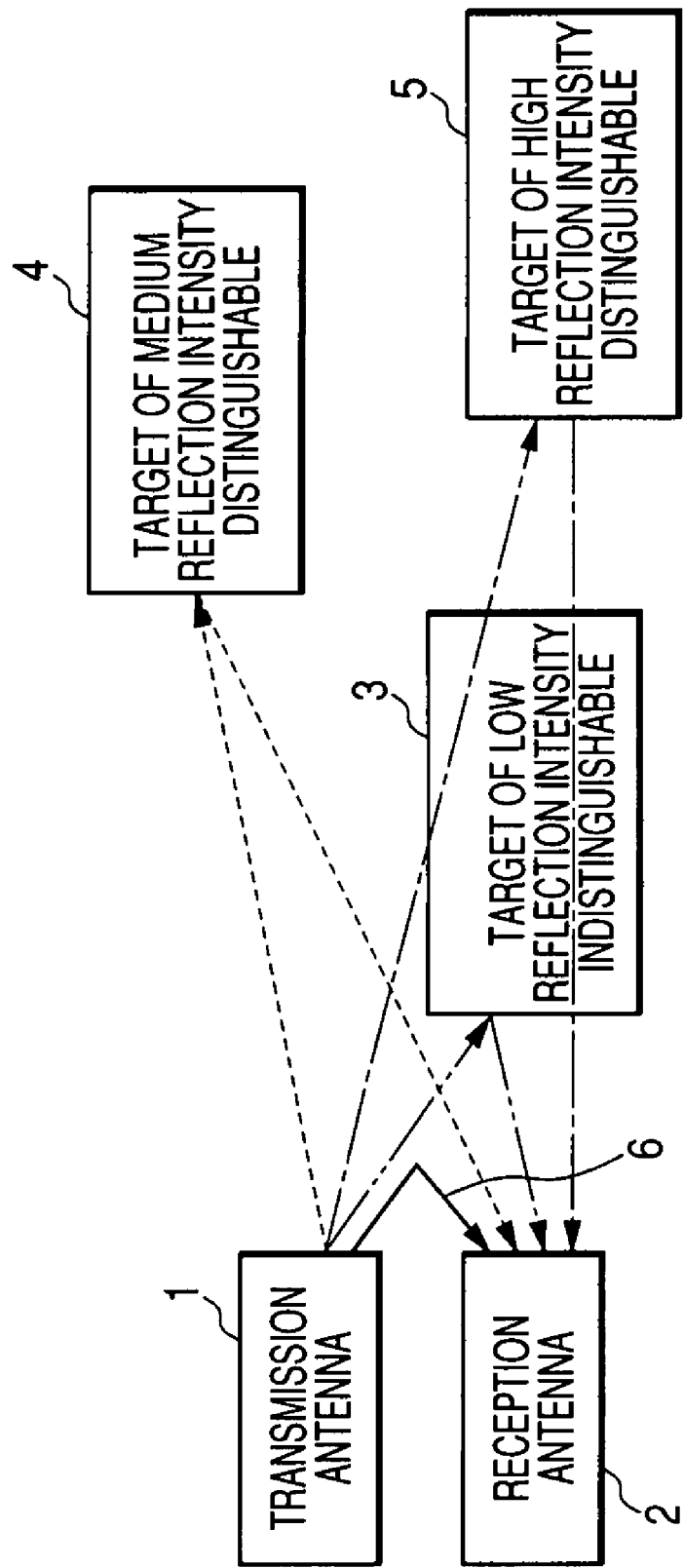
FIG. 1 is a view showing a relationship between a reflection intensity of a reflection wave from a target and target-distinguishing ability of a UWB radar device.
Figure 2:
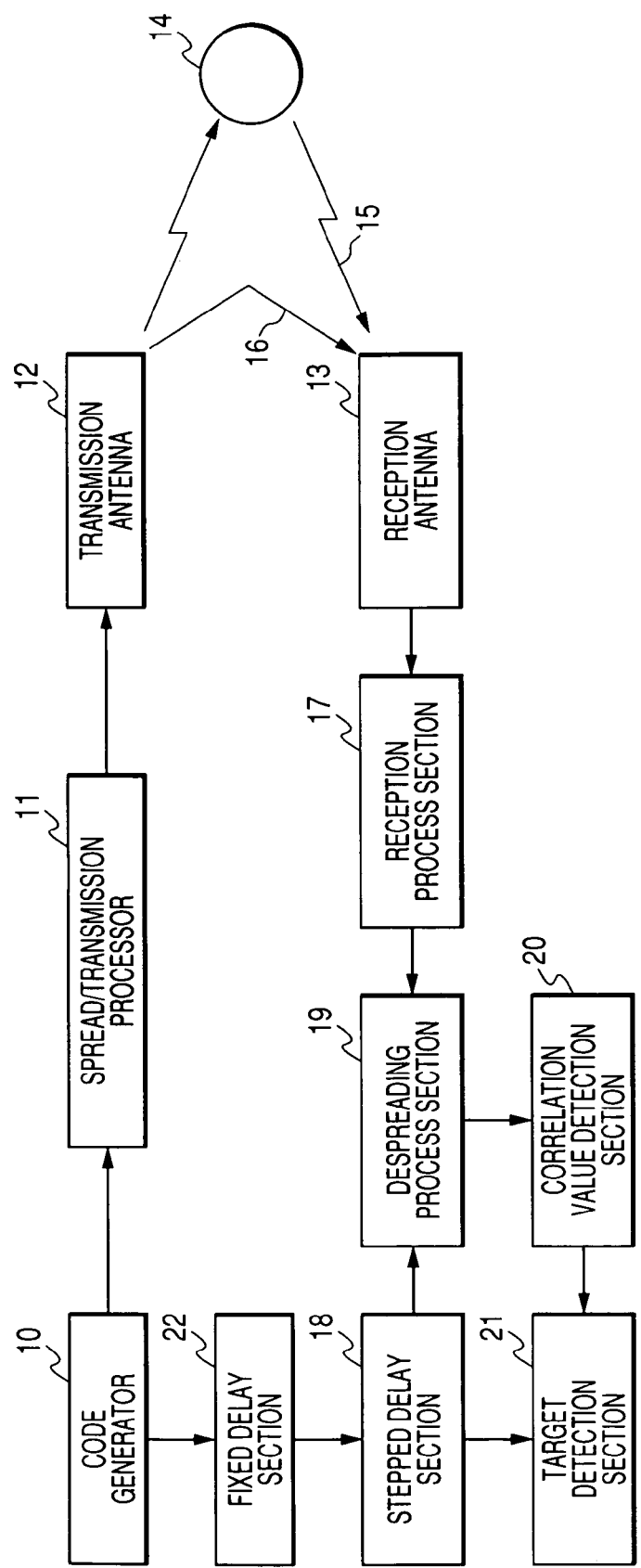
FIG. 2 is a block diagram showing a configuration of a UWB radar device according to a first embodiment of the invention.

FIG. 2 is a block diagram showing a schematic configuration of a UWB radar device according to a first embodiment of the invention. In this embodiment, a target detection section 21 shown in FIG. 2 is configured to correct a correlation value. Prior to description thereof, the configurations and operations of a spread spectrum radar device will be described with reference to FIG. 2.

In FIG. 2, reference numeral 10 denotes a code generator for generating a spectrum spreading code and a despreading code; 11 denotes a spread/transmission processor for modulating a transmission signal with the spectrum spreading code generated by the code generator 10 and for conducting transmission processing; and 12 denotes a transmission antenna for transmitting the signal having been subjected to the spreading processing.

Reference numeral 13 denotes a reception antenna for receiving electric wave, which is transmitted from the transmission antenna 12, reflected by a target 14, and returned: in other words, receiving a reflection wave 15 reflected by the target 14. The reception antenna 13 also receives a direct wave 16 transmitted from the transmission antenna 12. Reference numeral 17 denotes a reception process section for applying a demodulation processing to a signal received by the reception antenna 13. Reference numeral 18 denotes a stepped delay section for delaying stepwise a despreading code generated by the code generator 10. Reference numeral 19 denotes a despreading process section for applying a despreading process and an A/D conversion process to the received signal with using the despreading code having been delayed by the stepped delay section 18. Reference numeral 20 denotes a correlation value detection section for determining a correlation value from the thus despread and A/D converted data. Reference numeral 21 denotes the target detection section for conducting various types of process such as determining a distance to the target, determining reception intensity, determining a relative velocity between the target and the vehicle on which the radar device is mounted, and identifying the target, on the basis of the determined correlation value.

A result of the process by the target detection section 21 is displayed on an unillustrated display, thereby calling attention to a driver: alternatively, the result may be input to an ECU of the vehicle, to thereby be utilized in various driving controls.

In the radar device shown in FIG. 2, timing of receiving a direct wave, which is directly transmitted by the antenna 12 and received by the antenna 13, is delayed by a predetermined amount with respect to a timing of a code generation by the code generator 10. The predetermined amount of delay is determined by the physical configuration, arrangement, and the like, of equipment. Accordingly, the despreading code generated by the code generator 10 must be delayed by the same amount as this delay. A fixed delay section 22 in FIG. 2 generates the delay for the above purpose (i.e., initial delay).

FIGS. 3A to 3G are timing charts for explaining operations of the radar device shown in FIG. 2, and particularly showing how a distance to the target is detected. FIG. 3A shows a code sequence for spreading spectrum generated by the code generator 10. FIG. 3B shows a despreading code sequence delayed stepwise by the stepped delay section 18. The predetermined initial delay is given to the despreading code sequence shown in FIG. 3B by the fixed delay section 22 for synchronizing the despreading code sequence with a receiving code.

The despreading code sequence shown in FIG. 3B is formed by means of delaying transmission codes (1), (2), (3), . . . , (n) in increments of, e.g., 1 clock cycle (i.e., one bit), by means of the stepped delay section 18. FIG. 3C shows a receiving code sequence of a direct wave. FIG. 3D shows a code sequence of a wave reflected by a target spaced from the radar device by a distance corresponding to 1 clock cycle. FIG. 3E shows a code sequence of a wave reflected by a target spaced from the radar device by a distance corresponding to 2 clock cycles.

As shown in FIGS. 3A to 3G, in a case of despreading the receiving code sequence shown in FIG. 3C of the direct wave with using of the despreading code sequence shown in FIG. 3B, a code 1 shows a strong correlation; and the remaining codes do not show strong correlations, because phases of the receiving codes and those of the despreading codes are deviated. Similarly, the code sequence shown in FIG. 3D of the wave reflected by the target spaced a distance corresponding to one clock cycle shows a strong correlation with the despreading code sequence at code 2. Furthermore, the code sequence shown in FIG. 3E of the wave reflected by the target spaced a distance corresponding to two clock cycles shows a strong correlation with the despreading code sequence at code 3.

Accordingly, whether or not a target for producing a reflection wave is present at each of the distances is detected as shown in FIG. 3G by despreading the receiving wave shown in FIG. 3F with using the despreading code sequence shown in FIG. 3B and detecting correlation values of the respective codes. More specifically, presence of a target is indicated when a strong correlation is found among correlation properties at respective distances corresponding to Om, Om+1 clock cycle, Om+2 clock cycles, and the like.

Figures 4A, 4B, 4C:
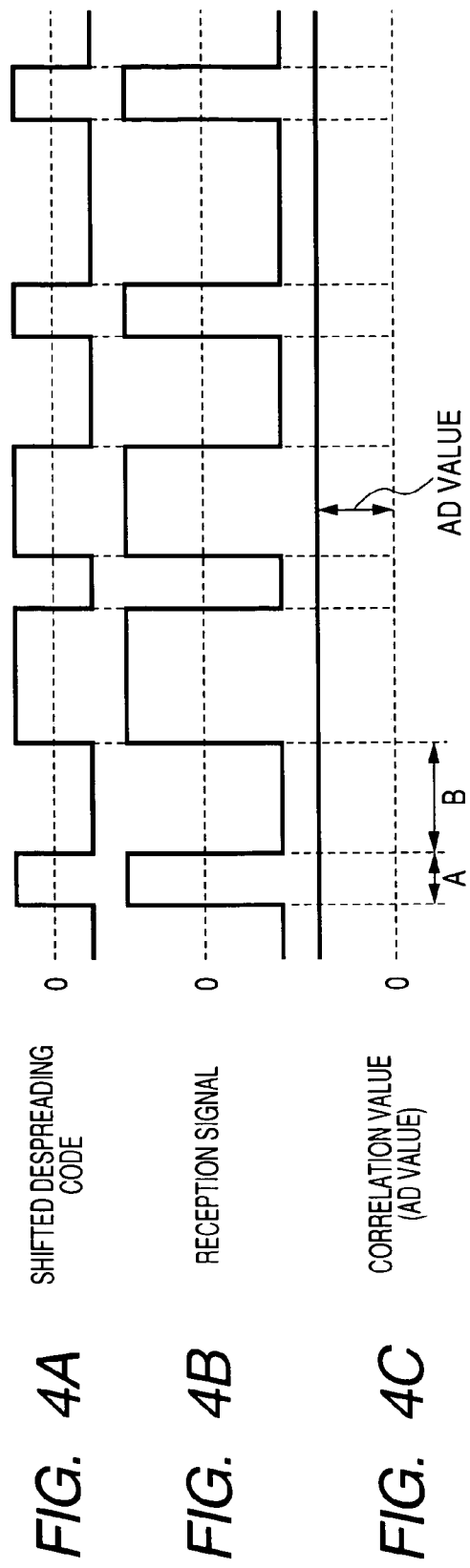
FIG. 4 is a view for explaining correlation value detection process.

FIGS. 4A to 4C are timing charts showing a process for acquiring correlation properties on the basis of the despreading code and the received signal, in a case where a single target is present. A signal shown in FIG. 4A denotes a despreading code delayed by the stepped delay section 18. A signal shown in FIG. 4B denotes a signal received by the antenna 13. A signal shown in FIG. 4C denotes a correlation value (an AD value) determined by the despreading process section 19 on the basis of the signals shown in FIGS. 4A and 4B.

In relation to detection of a correlation value, the signal shown in FIG. 4B is mixed with the signal shown in FIG. 4A and the result thereof is output (a duration A in FIG. 4C) when the signal shown in FIG. 4A is positive. When the signal shown in FIG. 4A is negative, the polarity of the signal shown in FIG. 4B is inverted and then mixed with the signal shown in FIG. 4A (a duration B in FIG. 4C). As the number of coincident bits between the signals shown in FIGS. 4A and 4B becomes larger, the correlation therebetween becomes higher; that is, the AD value becomes higher. Incidentally, the AD value is a value, which reflects reception intensity, in relation to a correlation value, which falls within a range of 1 to −1.

FIGS. 4A to 4C show correlation value detection in a case of a single target. However, in actual practice, two or more targets are involved, and a reception wave includes reflection waves reflected by the plurality of targets.

FIGS. 5A to 5F are views for explaining how a correlation value at a distance "a+1" is determined when an object of high reflection intensity is present at a distance "a" and an object of low reflection intensity is present at the distance "a+1." FIG. 5A shows a waveform of a signal output from the stepped delay section at the distance "a"; that is, a code having been shifted for obtaining a correlation at the distance "a." FIG. 5B shows a waveform of a signal output from the stepped delay section at the distance "a+1"; that is, a code having been shifted for obtaining a correlation at the distance "a+1." As shown in the waveforms (a) and (b), and also as described by reference to FIGS. 3A to 3G, a signal output from the stepped delay section at a distance and another signal output from the same at a distance adjacent thereto are offset from each other by one bit.

FIG. 5C shows a reflection wave from the distance "a+1," FIG. 5D shows a reflection wave from the distance "a," and FIG. 5E shows a composite wave of the reflection waves reflected at the distances "a" and "a+1"; namely, a received wave. When a target of high reflection intensity is present at the distance "a," at a timing when a correlation at the distance "a+1" is detected, the reflection wave (d) of a signal which is shifted by one bit from the signal shown by the waveform (b) is received while being superimposed on the reflection wave (c) reflected at the distance "a+1," thereby forming the composite wave (e) Determination of an autocorrelation at the distance "a+1" is performed on the basis of the waveform (b) and the composite wave (e) in accordance with the processing steps having been described by reference to FIG. 4C. A level indicated by a dotted line in FIG. 5F shows a level of an AD value at the distance "a+1" obtained as a result of the above processing. Since the shape of the reflection wave from the distance "a+1" is changed significantly under the influence of the reflection wave from the distance "a," the AD value is detected as a value different from its original value.

As is apparent in the waveform diagram shown in FIGS. 5A to 5F, the influence of the reflection wave from the distance "a" on the correlation value of the reflection wave from the distance "a+1" is determined by: the coincidence level between the code (FIG. 5A) used to determine the correlation at the distance "a" and that (FIG. 5B) used to determine the correlation at the distance "a+1"; and the reception intensity of the reflection wave from the distance "a." Since a code sequence has been determined for each radar device, codes used to determine the correlation at the distances "a," "a+1," "a+2," . . . have been known in advance. In addition, the reception intensity of the reflection wave from the distance "a" can be estimated from the detected AD value.

Therefore, the UWB radar device according to the first embodiment is configured such that a cross-correlation value imparted from a target of high reflection intensity at another distance is calculated by means of software on the basis of a code sequence and reception intensity; and a correlation value detected by the correlation value detection section 20 is corrected in accordance with the thus-calculated value.

Figure 6:
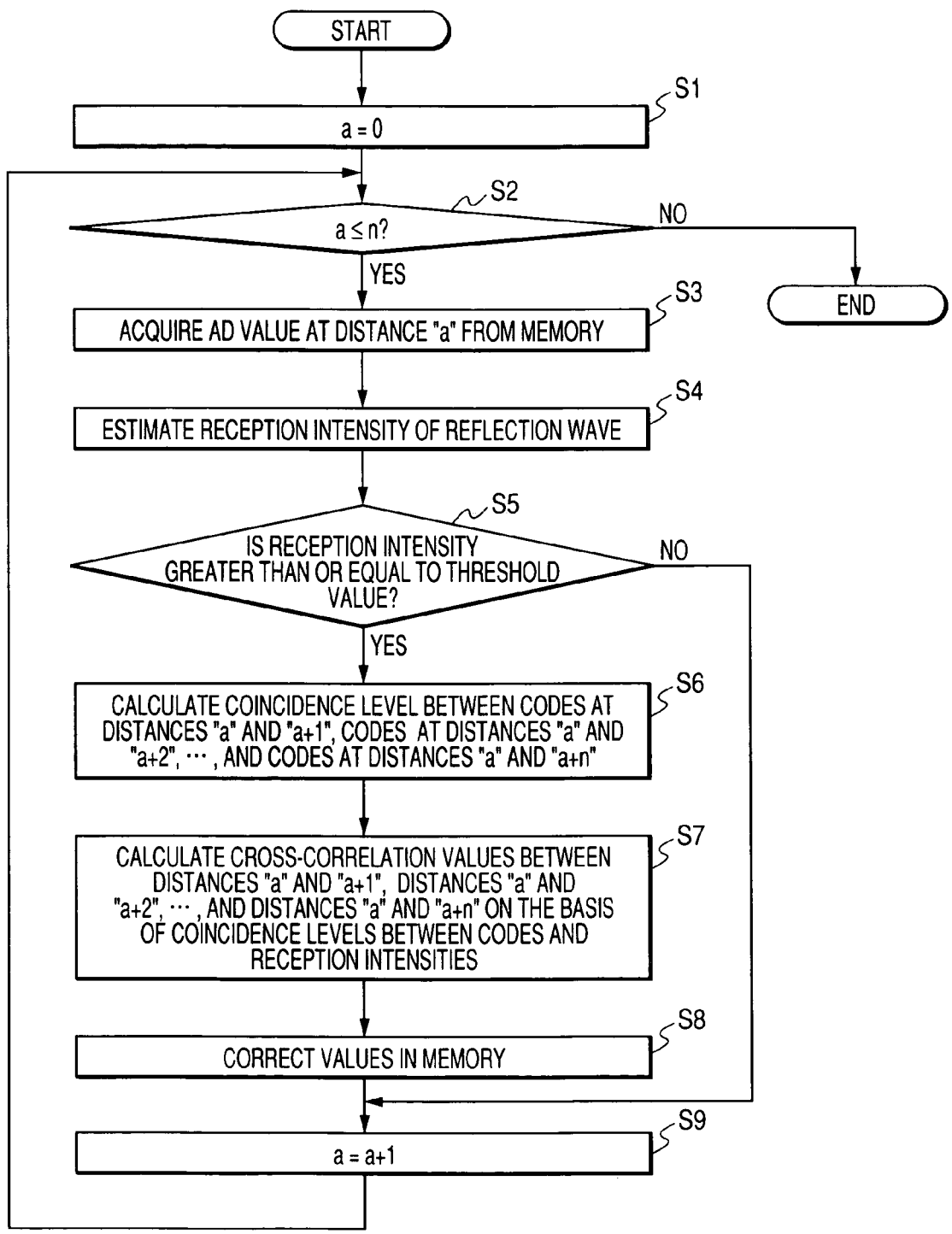
FIG. 6 is a flowchart for a correction process.

FIG. 6 is a flowchart showing a configuration of software stored in the target detection section 21 for the purpose of correcting a value obtained by the correlation value detection section 20. In the embodiment, it is assumed that the correlation value detection section 20 detects correlation values at respective distances within a range of 0 to "n", and that the detected correlation values are stored in a memory of the target detection section 21.

When the target detection section 21 is set to a correlation-value-correction mode, the distance "a" is set to 0 in step S1. In step 52, it is confirmed as to whether or not "a" is not higher than "n." In step S3, a correlation value; that is, an AD value, at the distance "a" is retrieved from the memory of the target detection section 21 in which correlation values are stored. In step S4, the reception intensity of a reflection wave from the distance "a" is estimated on the basis of the AD value obtained in step S3. This estimation is conducted in accordance with a subroutine for calculation on the basis of the AD value or by means of referring to a table, which has been prepared in advance and which indicates a relationship between AD value and reception intensity.

Figure 7:
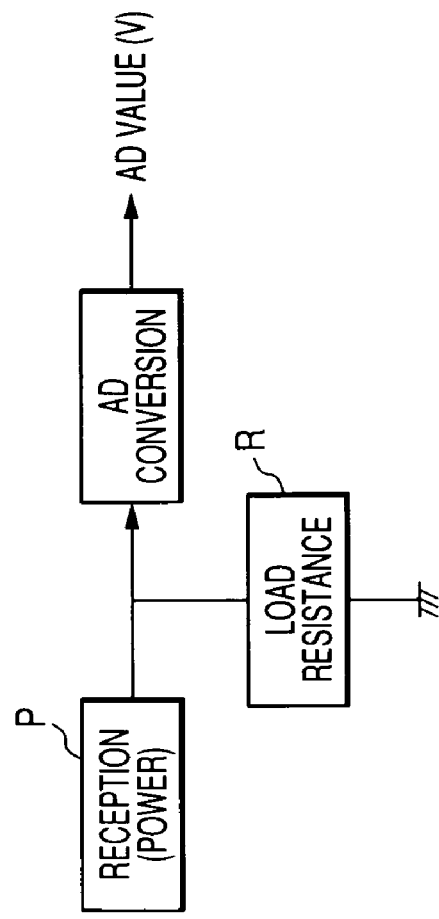
FIGS. 7A and 7B are views showing a method for estimating reception intensity of a reflection wave.

FIGS. 7A and 7B are views for explaining methods for estimating reception intensity on the basis of an AD value. FIG. 7A shows a method for calculating a reception intensity of a reflection wave on the basis of the AD value obtained in step S3. The AD value, which is indicated by voltage (V), is obtained by means of A/D converting a receiving power P by way of a load resistance R. The load resistance R of the A/D input is a known value. Therefore, the power P can be obtained from: $P=V^2/R$. Accordingly, by means of applying this calculation to the acquired AD value, the reception intensity (power) can be estimated.

FIG. 7B shows a method for estimating a reception intensity of a reflection wave in step S4 in FIG. 6 by means of referring to a table having been prepared in advance. More specifically, powers for the respective AD values have been calculated in accordance with the method shown in FIG. 7A, and have been used to prepare a table shown in FIG. 7B in advance. When an AD value is obtained in step S3 in FIG. 6, a power (a reception intensity of a reflection wave) is estimated by means of referring to the table.

Figure 8:
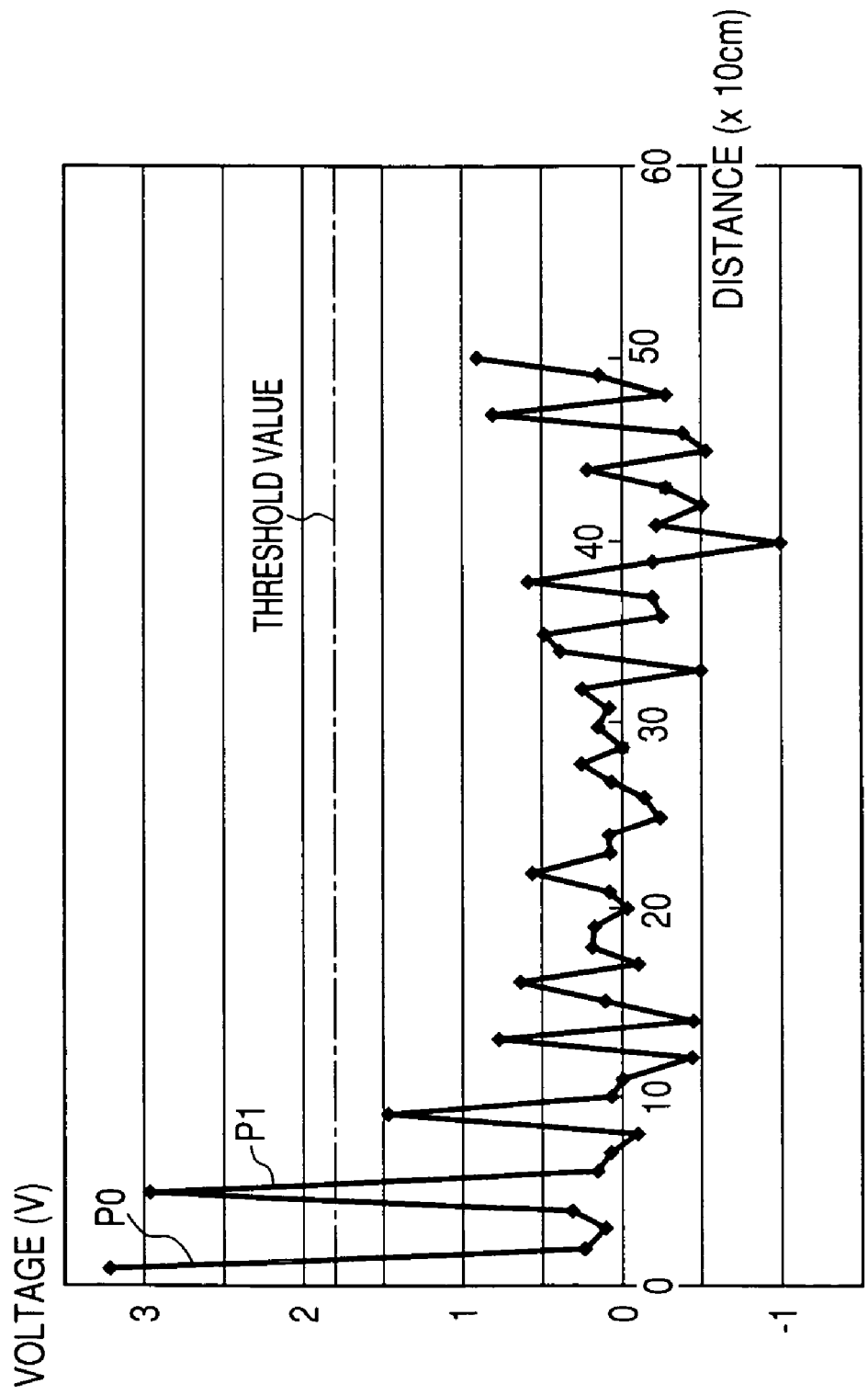
FIG. 8 is a view showing a threshold value set for a correlation value.

In the flowchart shown in FIG. 6, when the result of step S2 is NO; that is, when the value "a" is greater than "n," the processing is terminated. Upon estimation of the reception intensity in step S4, in step S5 a determination is made as to whether or not the estimated value is equal to or greater than a threshold value. The threshold value is set arbitrarily within a range where a reception intensity of a reflection wave from the distance "a" is strong and imparts a significant influence on correlation results at the distance "a+1" or subsequent distances. FIG. 8 shows an example for setting a threshold value on a graph of obtained correlation properties. The example shown in FIG. 8 indicates that correlation value peaks P0 and P1 exceed the threshold value.

Alternatively, when a determination has been made in advance that correction processing is to be conducted on, for instance, two correlation values constituted of a correlation value of the highest reception intensity and a correlation value of the second highest reception intensity, it is not necessary to set the threshold value. In this case, in the example of FIG. 8, influences of the correlation value peaks P0 and P1 on other correlation value peaks are detected.

When the result of step S5 is YES, a determination is made that a target of high reflection intensity is present at the distance "a," and the target imparts influences on correlation values at other distances. Accordingly, the acquired correlation values are corrected by means of performing step S6 and the following steps. To achieve the correction, first, in step S6, coincidence levels between a code at the distance "a" and those at the distance "a+1," "a+2," . . . , and "a+n" are respectively calculated. Meanwhile, the influence of the reflection wave from the distance "a" is not necessarily calculated for every correlation value in the memory of the target detection section 21; and a range where the influence thereon is to be calculated may be limited in advance.

A difference between a code used to obtain a correlation value at the distance "a" and a code used for obtaining a correlation value at the distance "a+1" lies in that the code is shifted by, for instance, one bit. A code sequence used to obtain a correlation value at the distance "a" is a code sequence having been set for each radar device. Accordingly, the calculation in step S6 can be performed easily by use of a known code for the distance "a."

After the coincidence levels between the code at the distance "a" and that at the distance "a+1" and subsequent distances are calculated in step S6, in step S7, the thus-calculated coincidence levels are multiplied by the estimated reception intensity of the reflection wave from the distance "a." Accordingly, cross-correlation values at the respective distances are obtained. In step S8, the cross-correlation values calculated in step S7 are subtracted from the correlation values at the distance "a+1" and subsequent distances stored in the memory of the target detection section 21, thereby obtaining corrected correlation values. Meanwhile, when the result of step S5 is NO, the process proceeds to step S9 and "a" is incremented by only 1, and step S2 and the steps that follow are repeated.

As a result, when a target of high reflection intensity is present at the subsequent distance, the influence of the target on the subsequent correlation values can be eliminated. The above processing is repeated until "a" exceeds "n" (i.e., until NO is obtained in step S2), and the processing is completed. As a result, the corrected correlation values are retained in the memory of the target detection section 21.

(Second Embodiment)

Figure 9:
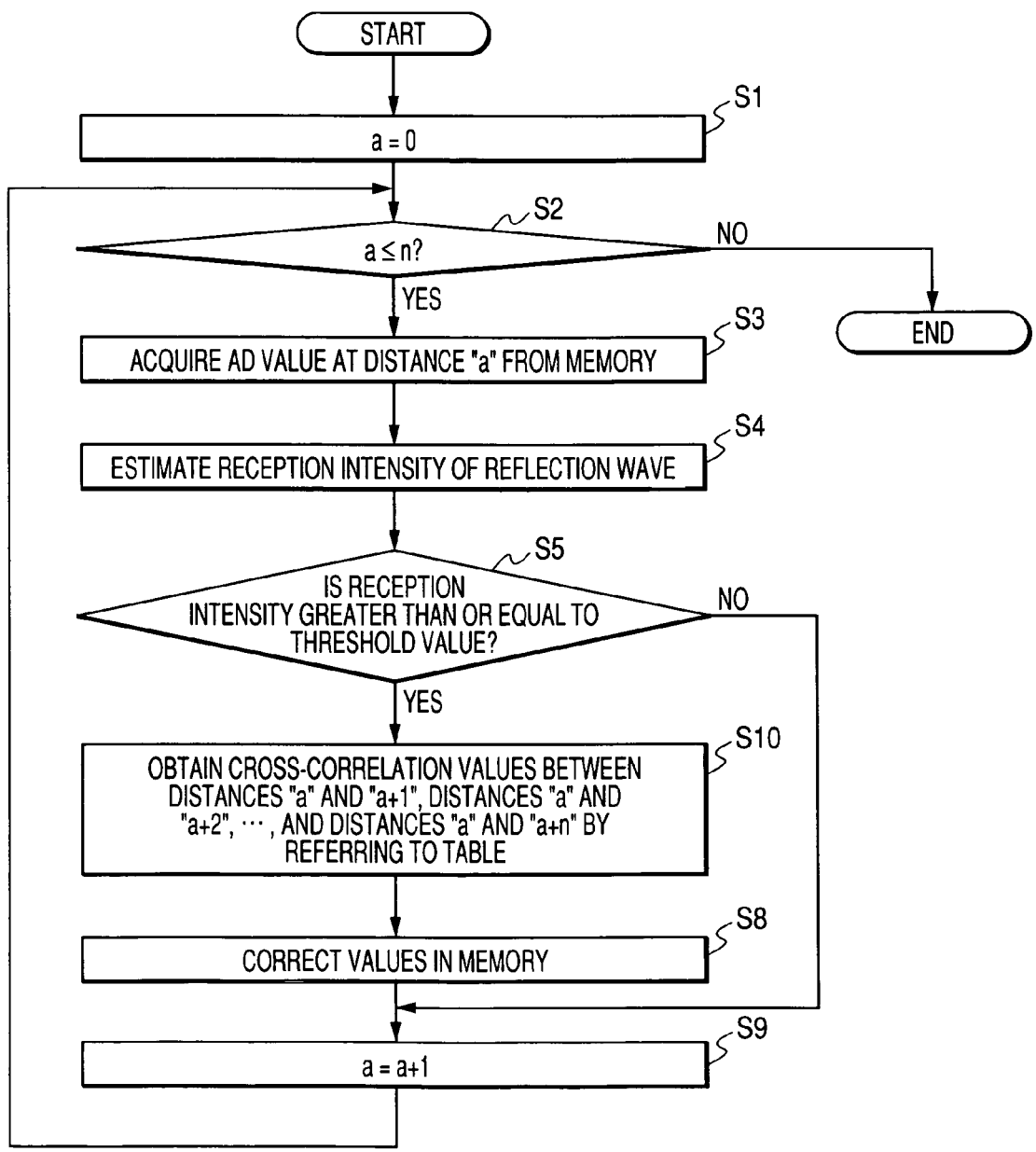
FIG. 9 is a flowchart showing operations of a radar device according to a second embodiment of the invention.

FIG. 9 is a flowchart for correcting correlation values according to a second embodiment of the present invention. Meanwhile, steps shown in FIG. 9 denoted by the same reference numerals as those in the flowchart shown in FIG. 6 indicate steps identical with or similar to those shown in FIG. 6, and repeated descriptions thereof are omitted.

In the first embodiment, calculation of cross-correlation values shown in steps S6 and S7 is conducted by use of software. However, the second embodiment shown in FIG. 9 is characterized in that the cross-correlation values are obtained by means of referring to a table having been prepared in advance. Accordingly, step S10 indicates a step for obtaining the cross-correlation values by referring to the table.

Step S10 will be described in detail with reference to FIGS. 10 and 11. FIG. 10 is a table showing coincidence levels between codes. A code sequence has been determined for each radar device. Therefore, a coincidence level between a code used to obtain a correlation value at the distance "a" and a code used to obtain a correlation value at the distance "a +k" (k=1, 2, . . . , n) with regard to each bit can be calculated in advance. Values in the table in FIG. 10 are obtained as a result of calculation on all the codes on an assumption that a case where polarities of the respective bits coincide is +1, and a case where those are different from each other is −1. The table is prepared in advance, and stored in the target detection section 21.

FIG. 11 is a table, which tabulates cross-correlation values, which is obtained on the basis of coincidence levels between codes having been obtained in FIG. 10 and reception intensities of reflection waves from at the distance "a." This table has also been prepared in advance, and stored in the target detection section 21.

The tables shown in FIGS. 10 and 11 are utilized as follows. For instance, when "a" is 0, a coincidence level in relation to a code at the distance 1 is found to be +2 in the table of FIG. 10. When, a reception intensity of a reflection wave from the distance 0 is assumed to be 2, a cross-correlation value in a case where a coincidence level between the codes is +2 is found to be +4 by means of referring to the table shown in FIG. 11. As a result, the cross-correlation value (the AD value) representing a degree of influence, which a reflection wave of the reception intensity 2 from the distance 0 imparts to the correlation value at the next distance 1, is determined to be +4.

Meanwhile, in the second embodiment, the cross-correlation values used in the correction of the correlation values are obtained by means of referring to the table in step 10. Therefore, loads imposed on software can be reduced significantly; however, a large capacity of memory is required therefor. In contrast, in the first embodiment, loads imposed on software are heavy. However, the first embodiment is advantageous in not requiring large memory capacity.

Figure 12:
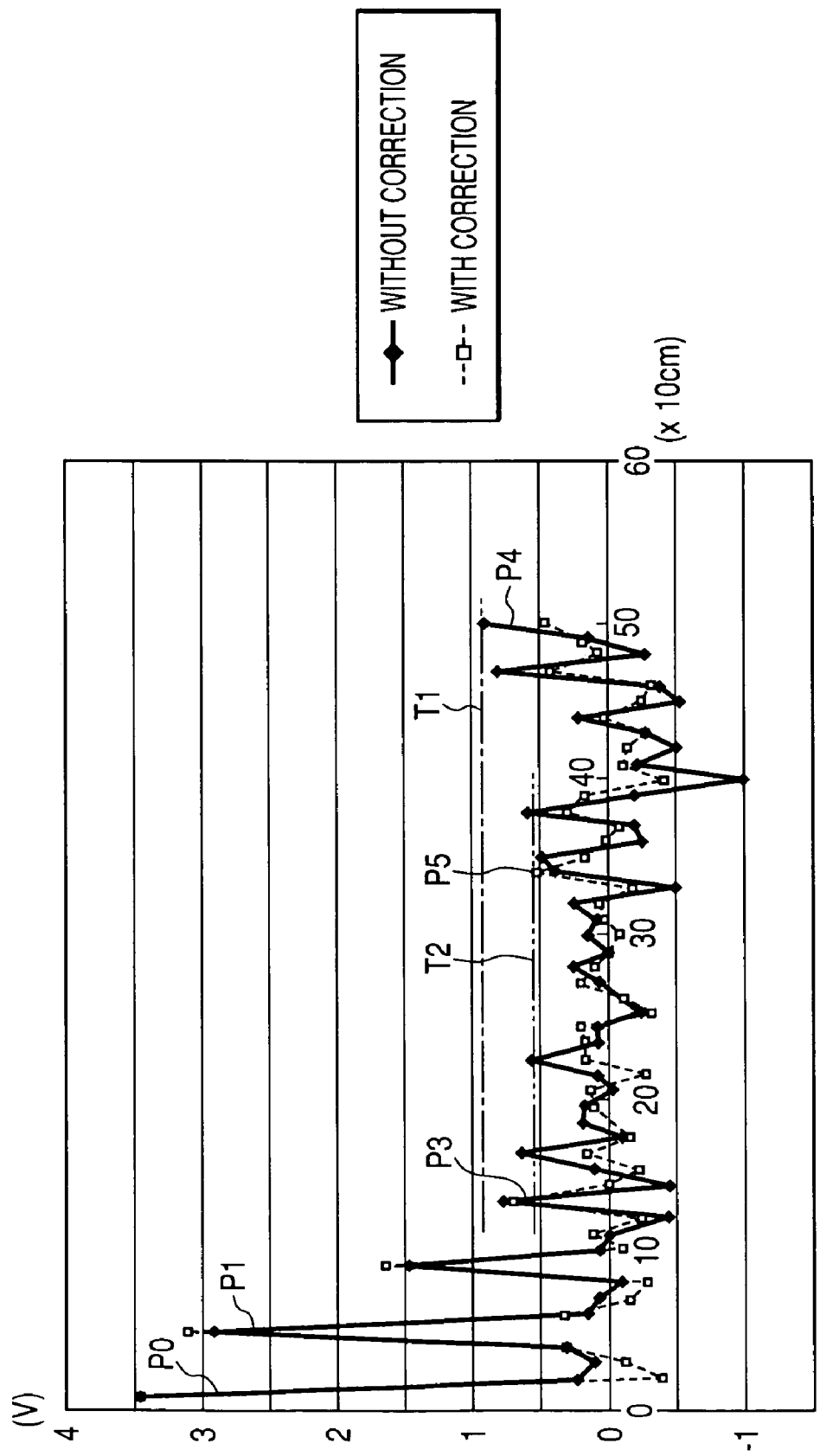
FIG. 12 is a diagram of cross-correlation properties showing effects of the embodiments of the invention.

FIG. 12 is a graph showing correlation values corrected in accordance with the procedure shown in FIG. 6 or in FIG. 9 and those before correction. In the drawing, the horizontal axis denotes a distance from the radar device (×10 cm), and the vertical axis denotes voltage (V). A solid line in the drawing indicates a graph of correlation values before correction, and a dotted line indicates those after correction. The drawing shows that by means of eliminating influences of the direct wave P0 and influences of the correlation value peak P1, whose intensity is the second highest, other correlation values are corrected.

An effect of the correction seen from FIG. 12 is that, by virtue of the correction of the correlation values, a peak P3 can be distinguished as a peak generated by a reflection at a target. A maximum value of the cross-correlation values before correction is T1 of a peak P4, which is higher than a correlation value of the peak P3 before correction. Thus, according to the data before correction, the peak P3 is difficult to distinguish as a peak generated by reflection at a target. However, as a result of correction of the correlation values, a maximum value of the cross-correlation values after correction is shifted to T2 of a peak P5, which is lower than a correlation value of the peak P3 after correction. As a result, the peak P3 can be recognized as a peak generated by reflection by a target.

Meanwhile, the first and second embodiments perform correction of correlation values after detecting all the correlation values at the correlation value detection section. However, the invention is not limited thereto. As a matter of course, for instance, the following method may be employed. That is, at a time point where a single correlation value is detected, the influence thereof on detection of a correlation value at the subsequent distance may be calculated: and the result may be reflected on a detected value at a time point where a correlation value at the subsequent distance is detected.

(Third Embodiment)

In the above-mentioned first and second embodiments, the correction process is applied to an acquired AD value by use of software. However, in some radar devices, which must exhibit a certain processing speed, processing by use of software cannot fully satisfy the requirement. In a third embodiment, for the purpose of satisfying the requirement regarding processing speed, correlation values are corrected by use of hardware.

As described with reference to FIGS. 5A to 5F, in a case where a target of high reflection intensity is present at the distance "a," a reception wave at a timing for obtaining a correlation value at the distance "a+1" is the composite wave shown in FIG. 5E, in which the reflection waves reflected at the distances "a" and "a+1" are combined. Therefore, by means of superimposing an inverted wave of the reflection wave shown in FIG. 5D reflected at the distance "a" on the composite wave shown in FIG. 5E, the influence of the reflection wave from the distance "a" can be eliminated from the composite wave shown in FIG. 5E. Accordingly, the composite wave shown in FIG. 5E is rendered to include only the reflection wave shown in FIG. 5C reflected at the distance "a+l."

Accordingly, if it is possible to generate a cancel signal obtained by means of inverting a signal corresponding to the reflection wave from the distance "a" at a timing for obtaining correlation value at the distance "a+l," the influence from the distance "a" can be eliminated by means of superimposing the cancel signal on a reception wave at the timing for obtaining the correlation value at the distance "a+1."

Reflection intensity of a reflection wave from a certain target and/or a distance between the certain target and the UWB radar device is known in advance. The reflection wave from the certain target includes: (a) a direct wave, which is directly transmitted from the transmission antenna 12 and received by the reception antenna13; and (b) a reflection wave from a substantially fixed reflection point (i.e., a target), such as an engine hood of a vehicle and a bumper, whose location is roughly determined by physical arrangement of the UWB radar device or by a specification thereof. The third embodiment utilizes the above fact, and is configured so as to produce a cancel signal with respect to the direct wave or a reflection wave from the fixed reflection point by means of hardware.

Figure 13:
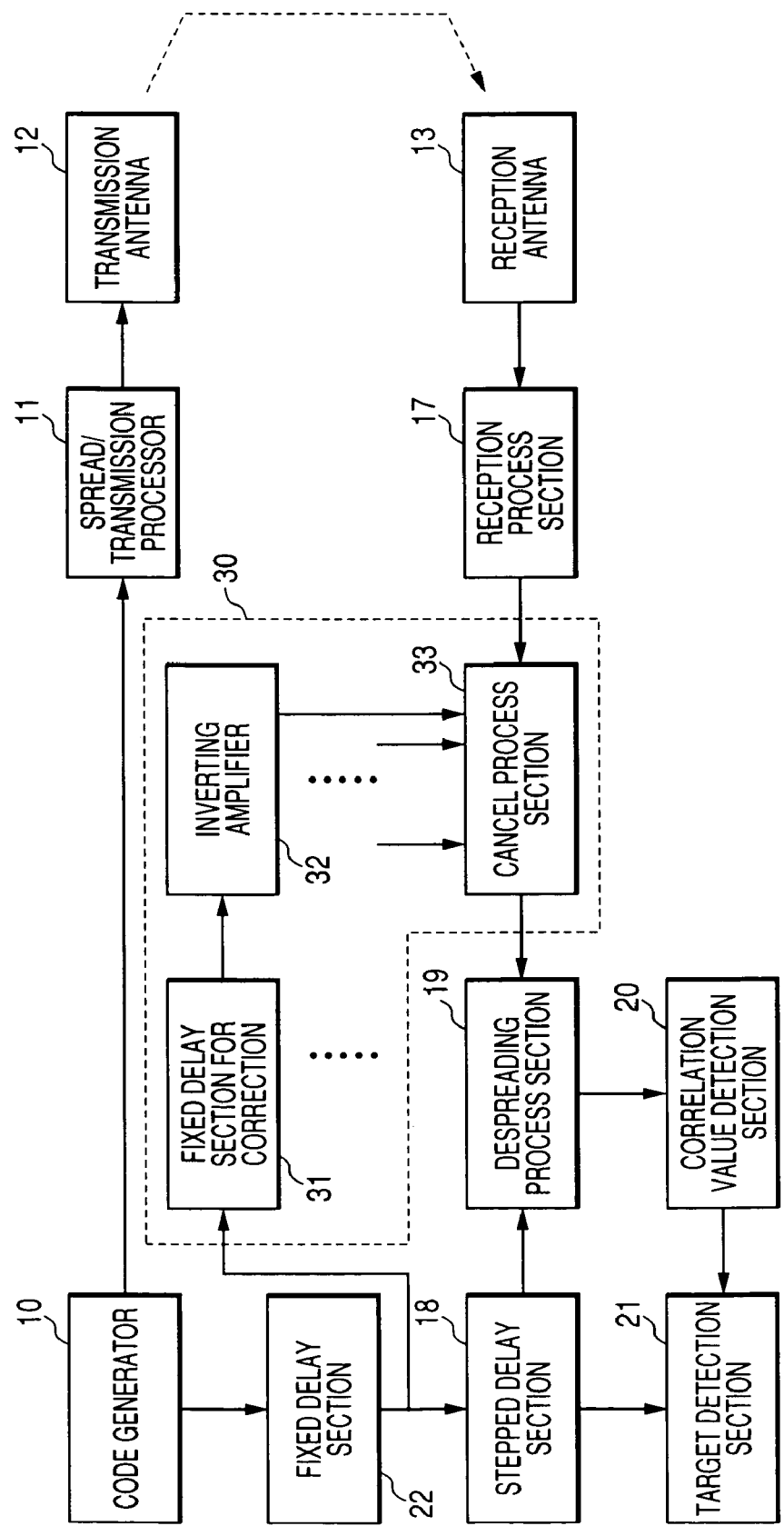
FIG. 13 is a block diagram showing a UWB radar device according to a third embodiment of the invention.

FIG. 13 is a block diagram showing a configuration of a UWB radar device according to the third embodiment of the invention. In the drawings, which will be described hereinafter, elements denoted by the same reference numerals as those in FIG. 2 denote elements identical or similar to those in FIG. 2, and repeated descriptions thereof are omitted.

In FIG. 13, reference numeral 30 denotes a correction circuit for eliminating the influence of a direct wave or that of a reflection wave from a fixed reflection point. The correction circuit 30 includes a fixed delay section 31 for correction, an inverting amplifier 32, and a cancel process circuit 33. The correction circuit 30 is configured so as to generate a cancel signal, and superimpose the cancel signal on an output from the reception process section 17, thereby eliminating from the reception wave the direct wave or the reflection wave produced by the fixed reflection point. Required number or feasible number of pairs of the fixed delay section 31 and the inverting amplifier 32 are disposed. When the UWB technique is employed, a speed of a single bit of a code corresponds to a distance resolution; and a unit distance thereof falls within a range of about a few to 10 cm. With using such distance resolution, a direct wave may spread across a plurality of unit distances. In addition, a reflection point, which is substantially fixed by virtue of a mounting condition, is present. Therefore, for the purpose of eliminating influences of the direct wave and the fixed reflection point, the plurality of pairs of the fixed delay section 31 and the inverting amplifier 32 are provided.

More specifically, the correction circuit 30 causes the fixed delay section 31 and the inverting amplifier 32 to generate as an analog value a signal, which cancels the influence of a direct wave spread across a plurality of unit distances or that of a reflection wave from a fixed reflection point, in accordance with a timing and intensity, which have been adjusted therefor. The fixed delay section 31 delays the despreading code output from the fixed delay section 22 by a predetermined amount, which corresponds to a transmission delay between emission of a transmission wave from the transmission antenna 12 and reception of a reflection wave from the fixed reflection point. The inverting amplifier 32 inverts and amplifies the despreading code output from the fixed delay section 31 to generate the cancel signal. The cancel signal is superimposed on an output from the reception process section 17 at a timing for obtaining a correlation value of the subsequent distance, thereby eliminating the influence of the reflection wave originating from the previous distance. Therefore, in the despreading process section 19, only a reflection wave from the subsequent distance is processed, thereby determining an accurate correlation value.

(Fourth Embodiment)

Figure 14:
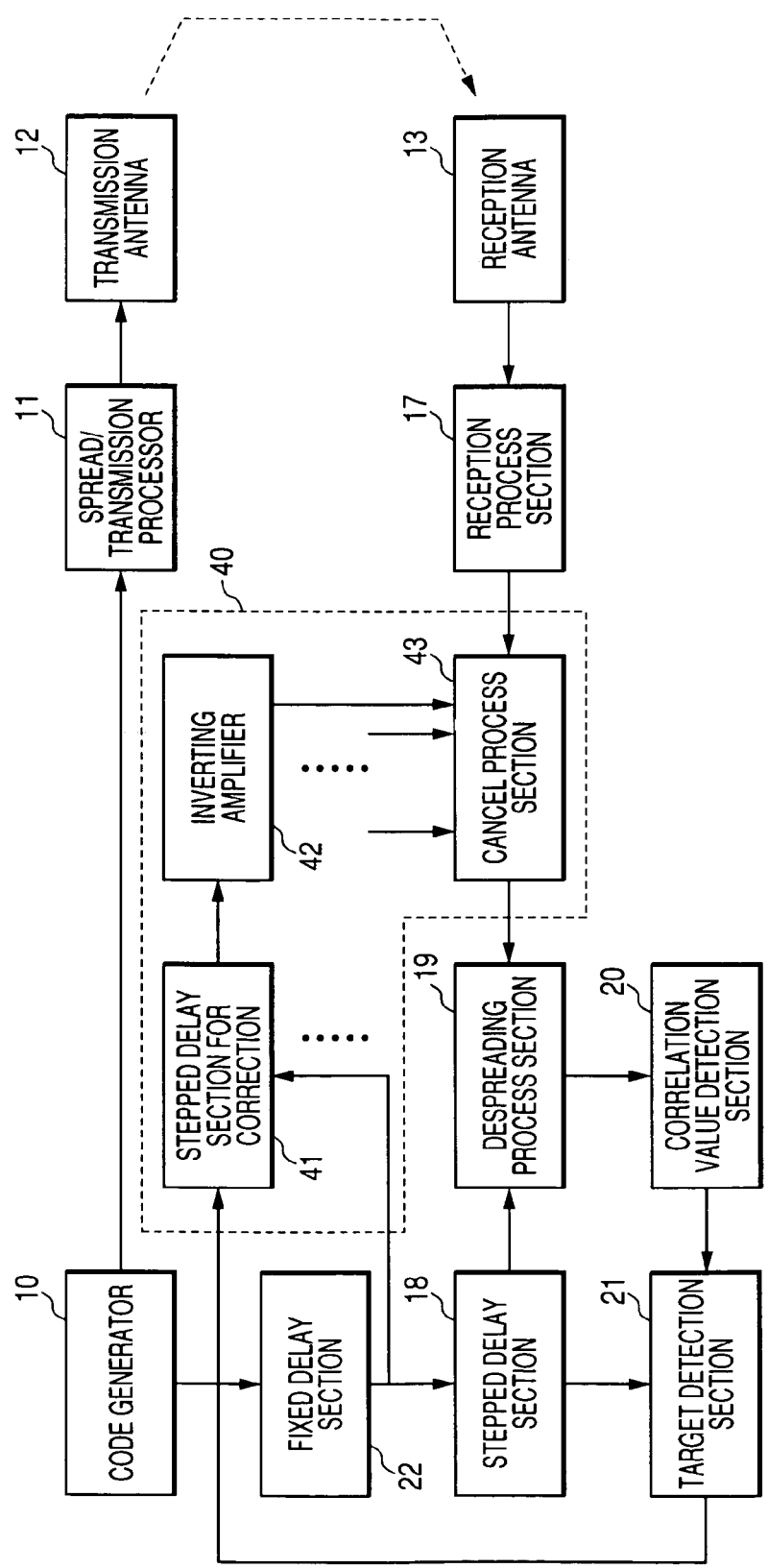
FIG. 14 is a block diagram showing a UWB radar device according to a fourth embodiment of the invention.

FIG. 14 is a block diagram showing a configuration of a UWB radar device according to a fourth embodiment of the invention. The fourth embodiment includes a correction circuit 40 in place of the correction circuit 30 of the UWB radar device of the third embodiment. The correction circuit 40 includes a stepped delay section 41 for correction, an inverting amplifier 42, and a cancel process circuit 43. Similar to the third embodiment, a required number or a feasible number of pairs of the corrective stepped delay section 41 and the inverting amplifier 42 are disposed.

The third embodiment shown in FIG. 13# which is configured for the purpose of eliminating the influence of the direct wave or the reflection wave from the fixed reflection point, cannot appropriately treat a moving target.

The device according to the fourth embodiment is configured so as to be capable of eliminating the influence of a reflection wave from a moving target. More specifically, when the target detection section 21 detects a target of high reflection intensity, the target detection section 21 estimates the reception intensity of a reflection wave from the detected target, and calculates a relative speed of the (moving) target. Thereupon, the stepped delay section 41 gives to the despreading code output from the fixed delay section 22 a delay corresponding to an estimated timing when the influence of the target of high reflection intensity appears. The cancellation section 43 performs cancel process involving an analog value, in accordance with the timing and reception intensity of the target of high reflection intensity having been determined the previous time. Accordingly, even when a reflection wave is a wave reflected by a moving object, cancel process similar to that described in the third embodiment can be performed.

(Fifth Embodiment)

In the fourth embodiment shown in FIG. 14, the correction circuit 40 is inserted between the reception process section 17 and the despreading process section 19. Therefore, after a first cancel process is performed by the correction circuit 40, control for preventing second or further cancel process must be performed. Since a second or subsequent cancel process cannot be performed, processing ends in an operation insufficient for eliminating the influence of a target of high reflection intensity.

To solve this problem, in a fifth embodiment shown in FIG. 15, a correction circuit 50 including a branch circuit 55 is disposed between the reception process section 17 and the despreading process section 19. In FIG. 15, the correction circuit 50 includes a stepped delay section 51 for correction, an inverting amplifier 52, a cancel process circuit 53, a despreading process section 54 for correction, and a correlation value detection section 56 for correction. When a target of high reflection intensity is present, the correction circuit 50 performs second and subsequent cancel process.

In addition, process for detecting a correlation value of a target through a normal receiving operation is performed by means of guiding a reception signal having been branched in the branch circuit 55 to the despreading process section 19, the correlation value detection section 20, and the target detection section 21. As a result, correction can be conducted as required.

FIGS. 16A to 16I are timing charts for explaining the operations of the circuits shown in FIGS. 13 to 15. Hereinbelow, the operations of the circuits shown in FIGS. 13 to 15 will be described with reference to FIGS. 16A to 16I. Meanwhile, in FIGS. 16A to 16I, for the sake of simplicity of descriptions, timing charts show an ideal case where the transmission code and the reception code have no delay therebetween. In this case, the fixed delay 22 shown in FIGS. 13 to 15 is not necessary, or a delay amount is assumed to be 0.

A waveform shown in FIG. 16A indicates a transmission code sequence. A waveform shown in FIG. 16B indicates an output from the stepped delay section 18; that is, a waveform of a signal where each code of the despreading code sequence is delayed by one bit. A waveform shown in FIG. 16C indicates a reflection wave from a distance corresponding to a delay of one bit. A waveform shown in FIG. 16D indicates a reflection wave from a distance corresponding to a delay of 2 bits. A waveform shown in FIG. 16E indicates a reflection wave from a distance corresponding to a delay of 3 bits. A waveform shown in FIG. 16D indicates a composite waveform of these reflection waves.

Furthermore, a waveform shown in FIG. 16G is an output waveform from the stepped delay section 41 or 51 for correction, and is such a signal that the despreading code is delayed by one bit. A waveform shown in FIG. 16H indicates a cancel signal formed as an output from the inverting amplifier 42 or 52. A waveform shown in FIG. 16I indicates a composite wave of the reflection wave shown in FIG. 16F and the cancel signal shown in FIG. 16H.

According to the embodiments shown in FIGS. 14 and 15, the cancel process is applied to the subsequent reception process on the basis of a judgment about a target of high reflection intensity of the preceding time by the target detection section 21. Accordingly, when a correlation value is determined to be large at a timing H1 of the waveform shown in FIG. 16C, the inverting amplifier 42 or 52 inverts the waveform shown in FIG. 16G output from the corrective stepped delay section 41 or 51 at a timing for obtaining the subsequent correlation value; that is, a timing H2, and further amplifies the inverted waveform in accordance with reception intensity, thereby producing the cancel signal shown in FIG. 16H. By means of superposing the cancel signal on a reflection wave received by the cancel process circuit 43 or 53, as shown in the timing H2 of the waveform shown in FIG. 16I, the influence of the strong reflection delayed by one bit can be eliminated.

As a result, a corrected correlation value AD can be obtained. Meanwhile, the reception intensity of a reflection wave is a value for indicating voltage separation from 0 V. Accordingly, in the illustrated example, when the influence of the target of high reflection intensity is eliminated, the voltage (i.e., the correlation value) is increased in the negative side.

Meanwhile, in the third embodiment shown in FIG. 13, inverting amplification process is performed not on the basis of a determination about a target of strong reflection intensity of the preceding time by the target detection section 21, but on the basis of a predetermined timing; namely, a direct wave or a reflection wave from a fixed reflection point. With use of the result, a cancel signal is generated at the timing H2 in FIG. 16 on the basis of the waveform shown in FIG. 16G.

Meanwhile, as is apparent, effects similar to those in the present invention described with reference to FIG. 12 can be provided by using the UWB radar devices of the third to fifth embodiments.

What is claimed is:

1. A radar device comprising:
   a code generator that generates a spectrum spreading code and a despreading code;
   a transmission section that transmits a signal modulated with the spectrum spreading code;
   a reception section that receives a reflection wave of the signal, which is transmitted from the transmission section and reflected by a target;
   a delay section that delays the despreading code stepwise;
   a despreading process section that applies a despreading process to a signal received by the reception section, with using the despreading code delayed stepwise;
   a correlation value detection section that detects a correlation value from data output from the despreading process section;
   a target detection section that determines as to whether or not a target is present, based on the detected correlation value;
   an estimation section that estimates a reception intensity of a reflection wave from a target located at a first distance from the radar device, on a basis of the correlation value detected by the correlation value detection section;
   an acquisition section that acquires a cross-correlation value between the first distance and a second distance, on a basis of (x) the estimated reception intensity of the reflection wave from the target located at the first distance, (y) a delayed despreading code used to detect a correlation value for the first distance and (z) a delayed despreading code used to detect a correlation value for the second distance; and
   a correction section that corrects the correlation value for the second distance, which is detected by the correlation value detection section, on a basis of the cross-correlation value acquired, wherein:
   the first distance is different from the second distance.

2. The radar device according to claim 1, wherein the estimation section, the acquisition section and the correction section are implemented by a program stored in the target detection section.

3. The radar device according to claim 1, wherein the estimation section comprises a table regarding the reception intensity of the reflection wave, the table prepared in advance as a function of the correlation value detected by the correlation value detection section.

4. The radar device according to claim 2, wherein the estimation section comprises a table regarding the reception intensity of the reflection wave, the table prepared in advance as a function of the correlation value detected by the correlation value detection section.

5. The radar device according to claim 1, wherein the acquisition section comprises a cross-correlation value table, which is prepared in advance as a function of (p) the reception intensity of the reflection wave and (q) a coincidence level between the delayed despreading code used to detect a correlation value for the first distance and the delayed despreading code used to detect a correlation value for the second distance.

6. The radar device according to claim 2, wherein the acquisition section comprises a cross-correlation value table, which is prepared in advance as a function of (p) the reception intensity of the reflection wave and (q) a coincidence level between the delayed despreading code used to detect a correlation value for the first distance and the delayed despreading code used to detect a correlation value for the second distance.

7. The radar device according to claim 3, wherein the acquisition section comprises a cross-correlation value table, which is prepared in advance as a function of (p) the reception intensity of the reflection wave and (q) a coincidence level between the delayed despreading code used to detect a correlation value for the first distance and the delayed despreading code used to detect a correlation value for the second distance.

8. A radar device comprising:
a code generator that generates a spectrum spreading code and a despreading code;
a transmission section that transmits a signal modulated with the spectrum spreading code;
a reception section that receives a reflection wave of the signal, which is transmitted from the transmission section and reflected by a target;
a first delay section that delays the despreading code stepwise;
a first despreading process section that applies a despreading process to a signal received by the reception section, with using the despreading code delayed stepwise;
a first correlation value detection section that detects a correlation value from data output from the first despreading process section;
a target detection section that determines as to whether or not a target is present, based on the detected correlation value; and
a correction circuit comprising:
a second delay section that delays the despreading code generated by the code generator by a predetermined amount;
a inverting amplification section that inverts and amplifies the despreading code delayed by the second delay section to generate a cancel signal; and
a cancel process section that superimposes the cancel signal onto the signal received by the reception section.

9. The radar device according to claim 8, wherein:
the second delay section comprises a plurality of second delay sections;
the inverting amplitude section comprises a plurality of an inverting amplitude sections; and
number of the second delay sections and number of the inverting amplitude sections correspond to number of targets whose positions and reflection intensities are fixed and whose influence on a reflection wave is to be cancelled.

10. The radar device according to claim 8, wherein:
the second delay section delays the despreading code generated by the code generator stepwise; and
the inverting amplitude section generates the cancel signal on a basis of (s) a timing at which the target detection section detects a target the reception intensity of the reflection wave from which is larger than a predetermined threshold level, and (t) the reception intensity of the reflection wave from the target.

11. The radar device according to claim 10, wherein the correction circuit further comprises:
a branch circuit that branches an output of the reception section;
a second despreading process section that applies the despreading process to an output of the cancel process section with using the despreading code delayed by the second delay section; and
a second correlation value detection section that detects a correlation value from an output the second despreading process section; and
the branched output of the reception section is input to the cancel process section.

* * * * *